(12) United States Patent
Yang et al.

(10) Patent No.: US 12,005,861 B2
(45) Date of Patent: Jun. 11, 2024

(54) METHOD FOR CONNECTING BLUETOOTH KEY TO VEHICLE, VEHICLE BLUETOOTH SYSTEM, AND BLUETOOTH KEY

(71) Applicant: GUANGZHOU AUTOMOBILE GROUP CO., LTD., Guangdong (CN)

(72) Inventors: Tuchao Yang, Guangdong (CN); Ruifu Lai, Guangdong (CN); Yinggong Mo, Guangdong (CN); Shimeng Qin, Guangdong (CN)

(73) Assignee: GUANGZHOU AUTOMOBILE GROUP CO., LTD., Guangzhou (CN)

( * ) Notice: Subject to any disclaimer, the term of this patent is extended or adjusted under 35 U.S.C. 154(b) by 50 days.

(21) Appl. No.: 17/925,056

(22) PCT Filed: Jun. 1, 2021

(86) PCT No.: PCT/CN2021/097619
§ 371 (c)(1),
(2) Date: Nov. 14, 2022

(87) PCT Pub. No.: WO2021/259015
PCT Pub. Date: Dec. 30, 2021

(65) Prior Publication Data
US 2023/0192034 A1 Jun. 22, 2023

(30) Foreign Application Priority Data
Jun. 24, 2020 (CN) .......................... 202010583616.1

(51) Int. Cl.
*B60R 25/24* (2013.01)
*G07C 9/00* (2020.01)
*H04W 4/02* (2018.01)
*H04W 4/80* (2018.01)
(Continued)

(52) U.S. Cl.
CPC ........ *B60R 25/248* (2013.01); *G07C 9/00309* (2013.01); *H04W 4/025* (2013.01);
(Continued)

(58) Field of Classification Search
CPC ............ B60R 25/248; B60R 2325/101; G07C 9/00309; G07C 2009/00412; H04W 4/80;
(Continued)

(56) References Cited

U.S. PATENT DOCUMENTS

2012/0220283 A1 8/2012 Tadayon et al.
2017/0346934 A1* 11/2017 Dentamaro ....... H04M 1/72412
(Continued)

FOREIGN PATENT DOCUMENTS

CN 103368987 A 10/2013
CN 104219058 A 12/2014
(Continued)

OTHER PUBLICATIONS

WIPO, International Search Report dated Aug. 13, 2021.

*Primary Examiner* — Vernal U Brown
(74) *Attorney, Agent, or Firm* — Hodgson Russ LLP (57) ABSTRACT

A method for connecting a Bluetooth key to a vehicle, a vehicle Bluetooth system, and a Bluetooth key, comprises: when a mobile terminal enters a preset distance range of a vehicle, a Bluetooth master module of the vehicle performs authentication and connection with a Bluetooth key of the mobile terminal according to preset key information (S11); after the Bluetooth master module is successfully connected to the Bluetooth key, the Bluetooth master module generates an original random code and encrypts the original random code to obtain an encrypted random code (S12); the Bluetooth master module sends the original random code to a Bluetooth slave module, and sends the encrypted random code to the Bluetooth key (S13); and the Bluetooth slave module and the Bluetooth key perform bidirectional authentication according to the encrypted random code and the original random code, and when bidirectional authentication succeeds, the connection is established (S14).

14 Claims, 5 Drawing Sheets

(51) Int. Cl.
*H04W 12/06* (2021.01)
*H04W 12/63* (2021.01)

(52) U.S. Cl.
CPC ............ *H04W 4/80* (2018.02); *H04W 12/06* (2013.01); *H04W 12/63* (2021.01); *B60R 2325/101* (2013.01); *B60R 2325/205* (2013.01); *G07C 2009/00412* (2013.01)

(58) Field of Classification Search
CPC .. H04W 12/06; H04W 12/041; H04M 1/6091
See application file for complete search history.

(56) References Cited

U.S. PATENT DOCUMENTS

2018/0268628 A1* 9/2018 Jain .......................... G07C 9/25
2019/0018145 A1* 1/2019 Roovers ................ G01S 19/256

FOREIGN PATENT DOCUMENTS

| CN | 104753893 A | 7/2015 |
| CN | 106209811 A | 12/2016 |
| CN | 107027096 A | 8/2017 |
| CN | 107251105 A | 10/2017 |
| CN | 207115538 U | 3/2018 |
| CN | 107968781 A | 4/2018 |
| CN | 107969001 A | 4/2018 |
| CN | 108206996 A | 6/2018 |
| CN | 109067549 A | 12/2018 |
| CN | 109685959 A | 4/2019 |
| CN | 110635901 A | 12/2019 |

* cited by examiner

```
                                                                    S21
when a mobile terminal enters a preset distance range of a vehicle, the Bluetooth key
of the mobile terminal performs authentication and connection with the Bluetooth
master module of the vehicle according to preset key information S22
if the Bluetooth key is successfully connected with the Bluetooth master module, the
Bluetooth key receives the encrypted random code sent by the Bluetooth master
module S23
the Bluetooth key obtains a verification random code according to the encrypted
random code, and obtains a second key signal according to the verification random
code, and sends the second key signal to the Bluetooth slave module of the vehicle S24
the Bluetooth key receives the first key signal sent by the Bluetooth slave module of
the vehicle, and authenticates the Bluetooth slave module according to the first key
signal and the verification random code
```

METHOD FOR CONNECTING BLUETOOTH KEY TO VEHICLE, VEHICLE BLUETOOTH SYSTEM, AND BLUETOOTH KEY

RELATED APPLICATIONS

This application is a 371 of International Application PCT/CN2021/097619, filed Jun. 1, 2021, which is based upon and claims priority to Chinese Patent Application CN202010583616.1,"Method for connecting a Bluetooth key to a vehicle, a vehicle Bluetooth system, and a Bluetooth key", filed Jun. 24, 2020, the entire contents of which are incorporated herein by reference.

TECHNICAL FIELD

The invention relates to the technical field of vehicle communication, in particular to a method for connecting a Bluetooth key to a vehicle, a vehicle Bluetooth system, and a Bluetooth key.

BACKGROUND

At present, the Bluetooth key on the market has a non-inductive function, that is, when close to the vehicle, the Bluetooth of mobile phone and the car end are automatically connected, but due to the limitation of the automatic connection technology, many Bluetooth key products cannot realize this function, and many need to click the Bluetooth key APP to connect, so every time the Bluetooth key is connected to the vehicle, the user needs to take out the mobile phone and find the Bluetooth key APP to perform corresponding operations, resulting in a poor user experience.

SUMMARY

The present invention aims to provide a method, a Bluetooth device, and a Bluetooth key for connecting a Bluetooth key to a vehicle.

In an first aspect, the embodiment of the invention proposes a method for connecting a Bluetooth key to a vehicle, comprising:
  when a mobile terminal enters a preset distance range of a vehicle, a Bluetooth master module of the vehicle performs authentication and connection with a Bluetooth key of the mobile terminal according to preset key information;
  If the Bluetooth master module is successfully connected to the Bluetooth key, the Bluetooth master module wakes up the Bluetooth slave module of the vehicle, and generates an original random code and encrypts the original random code to obtain an encrypted random code;
  the Bluetooth master module sends the original random code to the Bluetooth slave module, and sends the encrypted random code to the Bluetooth key;
  The Bluetooth slave module obtains a first key signal according to the original random code, and broadcasts the first key signal; wherein the first key signal is configured to authenticate the Bluetooth slave module according to the first key signal and the encrypted random code when the Bluetooth key receives the first key signal;
  The Bluetooth slave module receives the second key signal of the Bluetooth key, and authenticates the Bluetooth key according to the second key signal and the original random code; wherein the second key signal is the verification random code obtained by the Bluetooth key according to the encrypted random code; When bidirectional authentication by the Bluetooth slave module and the Bluetooth key succeeds, the Bluetooth slave module is successfully connected to the Bluetooth key.

In some embodiments, the Bluetooth master module of the vehicle performs authentication and connection with a Bluetooth key of the mobile terminal according to preset key information, specifically includes:
  The Bluetooth master module broadcasts a first Bluetooth signal, receives a second Bluetooth signal broadcast by the Bluetooth key, and authenticates the Bluetooth key according to the second Bluetooth signal and preset key information;
  Wherein, the first Bluetooth signal is configured for the Bluetooth master module to perform authentication according to the first Bluetooth signal and preset key information when the Bluetooth key receives the first Bluetooth signal; When bidirectional authentication by the Bluetooth master module and the Bluetooth key succeeds, the Bluetooth master module is successfully connected to the Bluetooth key.

In some embodiments, the preset key information includes the UUID of the Bluetooth chip of the Bluetooth master module and the MAC address of the mobile terminal.

In some embodiments, the original random code includes a first original random code and a second original random code, and the encrypted random code includes a first encrypted random code obtained according to the first original random code and a second encrypted random code obtained according to the second original random code;
  Wherein the first key signal is the second original random code;
  Wherein the second key signal is the first verification random code obtained by the Bluetooth key according to the first encrypted random code;
  Wherein the Bluetooth slave module authenticates the Bluetooth key according to the second key signal and the original random code, specifically includes: the Bluetooth slave module matches the first verification random code with the first original random code; if the first verification random code matches the first original random code, the authentication is passed;
  Wherein the first key signal is specifically configured for the Bluetooth key to authenticate the Bluetooth slave module according to the matching result of the first key signal and the second verification random code when the Bluetooth key receives the first key signal, the second verification random code is obtained by the Bluetooth key according to the second encryption random code;

In some embodiments, the method further includes:
  When the connection between the Bluetooth slave module and the Bluetooth key fails, the Bluetooth slave module generates a connection failure message, and sends the connection failure message to the Bluetooth master module;
  The Bluetooth master module regenerates a new original random code according to the connection failure information, and encrypts the new original random code to obtain a new encrypted random code;
  the Bluetooth master module sends the new original random code to the Bluetooth slave module, and sends the new encrypted random code to the Bluetooth key;

The Bluetooth slave module generates a new first key signal according to the new original random code, and broadcasts the new first key signal;

The Bluetooth slave module receives the new second key signal of the Bluetooth key, and authenticates the Bluetooth key according to the new second key signal and the new original random code; wherein the new second key signal is a new first verification random code obtained by parsing the new encrypted random code by the Bluetooth key;

In some embodiments, the Bluetooth master module regenerates a new original random code according to the connection failure information, specifically includes:

The Bluetooth master module accumulates the number of times that the Bluetooth slave module fails to connect with the Bluetooth key according to the connection failure information, and determines whether the number of connection failure is greater than a preset threshold;

If the number of connection failures is less than or equal to the preset threshold, the Bluetooth master module regenerates a new original random code according to the connection failure information;

If the number of connection failures is greater than the preset threshold, the Bluetooth master module disconnects the connection with the Bluetooth key, and the Bluetooth slave module stops broadcasting the connection request.

Preferably, the vehicle includes a plurality of Bluetooth slave modules, and the plurality of Bluetooth slave modules are connected to the Bluetooth master module through CAN bus or LIN bus communication;

wherein, the Bluetooth master module wakes up the Bluetooth slave module of the vehicle, and generates an original random code and encrypts the original random code to obtain an encrypted random code, specifically includes:

The Bluetooth master module wakes up multiple Bluetooth slave modules of the vehicle;

The Bluetooth master module generates multiple groups of original random codes, and encrypts the multiple groups of original random codes to obtain multiple groups of encrypted random codes; wherein, the multiple groups of original random codes are different from each other.

In some embodiments, the method further includes:

The Bluetooth main module receives the signal strength information sent by the Bluetooth key, and determines the position of the Bluetooth key according to the signal strength information; wherein the signal strength information is the signal strength of the unsuccessful connected Bluetooth slave module periodically obtained by the Bluetooth key.

In a second aspect, an embodiment of the present invention further provides a vehicle Bluetooth system for performing the steps of the method for connecting a Bluetooth key to a vehicle in the embodiment of the first aspect. The vehicle Bluetooth system includes a Bluetooth master module and one or more Bluetooth slave modules connected with the Bluetooth master module through the CAN bus or LIN bus communication.

In a third aspect, an embodiment of the present invention further provides a method for connecting a Bluetooth key to a vehicle, including:

when a mobile terminal enters a preset distance range of a vehicle, the Bluetooth master module of the vehicle and the Bluetooth key of the mobile terminal perform authentication and connection according to preset key information;

If the Bluetooth key is successfully connected with the Bluetooth master module, the Bluetooth key receives the encrypted random code sent by the Bluetooth master module;

The Bluetooth key obtains a verification random code according to the encrypted random code, and obtains a second key signal according to the verification random code, and sends the second key signal to the Bluetooth slave module of the vehicle;

The Bluetooth key receives the first key signal sent by the Bluetooth slave module of the vehicle, and authenticates the Bluetooth slave module according to the first key signal and the verification random code;

Wherein, the second key signal is configured to authenticate the Bluetooth key according to the second key signal and the original random code when the Bluetooth slave module receives the second key signal, the original random code is generated by the Bluetooth master module, and the encrypted random code is obtained by the Bluetooth master module according to the original random code; When bidirectional authentication by the Bluetooth slave module and the Bluetooth key succeeds, the Bluetooth slave module is successfully connected to the Bluetooth key.

In some embodiments, the Bluetooth master module of the vehicle and the Bluetooth key of the mobile terminal perform authentication and connection according to preset key information, specifically includes:

The Bluetooth key broadcasts a second Bluetooth signal, receives a first Bluetooth signal broadcast by the Bluetooth master module, and authenticates the Bluetooth master module according to the first Bluetooth signal and preset key information;

Wherein, the second Bluetooth signal is configured for the Bluetooth key to perform authentication according to the second Bluetooth signal and preset key information when the Bluetooth master module receives the second Bluetooth signal; When bidirectional authentication by the Bluetooth master module and the Bluetooth key succeeds, the Bluetooth master module is successfully connected to the Bluetooth key.

In some embodiments, the preset key information includes the UUID of the Bluetooth chip and the MAC address of the mobile phone.

In some embodiments, the Bluetooth key receives the first key signal broadcast by the Bluetooth slave module of the vehicle, specifically includes:

The Bluetooth key obtains vehicle information corresponding to the Bluetooth master module;

The Bluetooth key screens the currently received Bluetooth signal according to the vehicle information, so as to receive the first key signal broadcast by the Bluetooth slave module of the vehicle corresponding to the vehicle information.

In some embodiments, the original random code includes a first original random code and a second original random code, and the encrypted random code includes a first encrypted random code obtained according to the first original random code and a second encrypted random code obtained according to the second original random code; The verification random code includes a first encrypted random code obtained according to the first original random code and a second verification random code obtained according to the second encrypted random code;

Wherein the first key signal is the second original random code, and the second key signal is the first verification random code;

Wherein the Bluetooth key authenticates the Bluetooth slave module according to the first key signal and the verification random code, specifically includes: the Bluetooth key matches the second original random code with the second verification random code; if the second original random code matches the second verification random code, the authentication is passed;

Wherein, the second key signal is specifically configured for the Bluetooth slave module to perform authentication according to the matching result of the second key signal and the first original random code when receives the second key signal.

Other features and advantages of the present invention will be described in the following description and will be apparent partly from the description, or will be understood by implementing the embodiments of the present invention. The objectives and other advantages of the invention may be realized and attained by the structure particularly pointed out in the description, claims and drawings.

BRIEF DESCRIPTION OF THE DRAWINGS

In order to explain the technical solutions of the embodiments of the present invention or the prior art more clearly, the following will briefly introduce the drawings that need to be used in the description of the embodiments or the prior art. Obviously, the drawings in the following description are only some embodiments of the present invention. For those of ordinary skill in the art, without any creative work, other drawings can be obtained according to these drawings.

DETAILED DESCRIPTION

Various exemplary embodiments, features and aspects of the present disclosure will be described in detail below with reference to the accompanying drawings. The same reference numbers in the figures denote elements that have the same or similar functions. While various aspects of the embodiments are shown in the drawings, the drawings are not necessarily drawn to scale unless otherwise indicated.

In addition, in order to better illustrate the present invention, numerous specific details are given in the following specific embodiments. It will be understood by those skilled in the art that the present invention may be practiced without certain specific details. In some instances, means well known to those skilled in the art have not been described in detail in order not to obscure the subject matter of the present invention.

The First Embodiment

Figure 1:
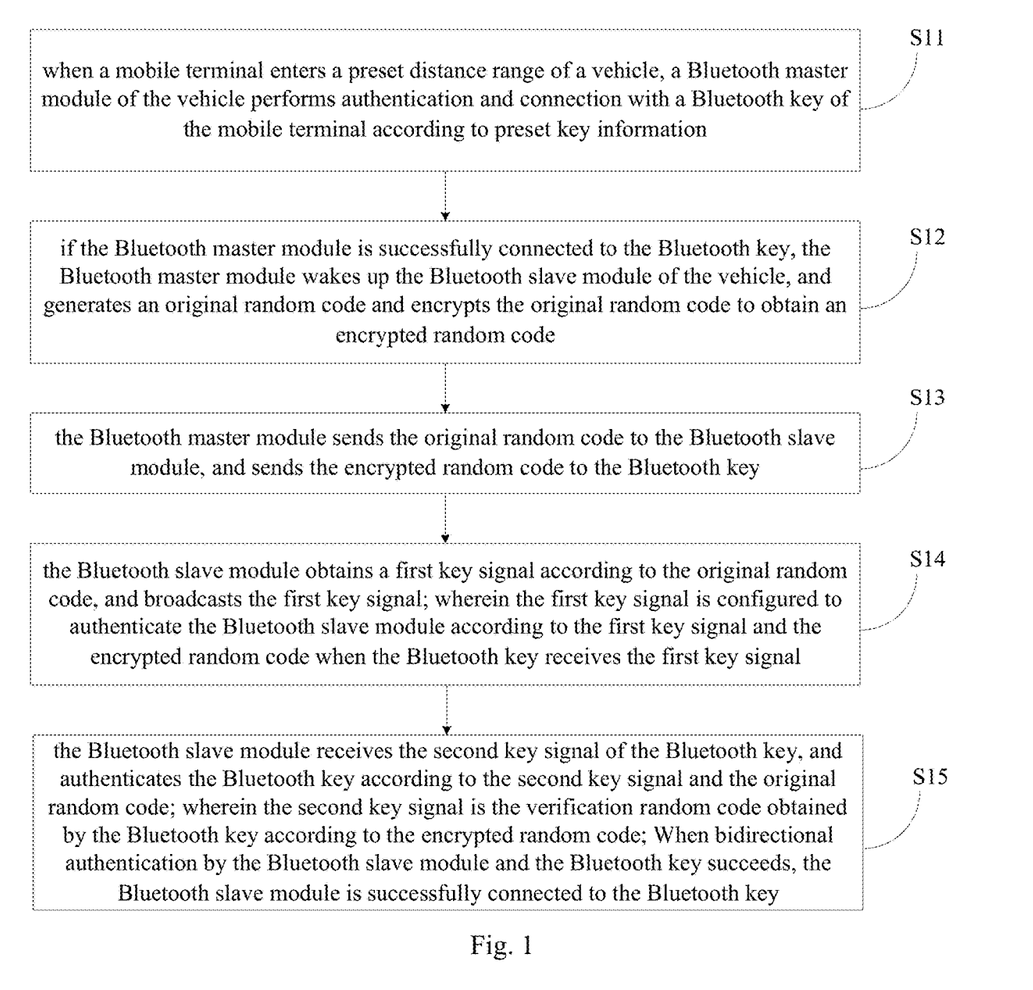
FIG. 1 is a schematic flowchart of a method for connecting a Bluetooth key to a vehicle according to the first embodiment of the present invention.

Referring to FIG. 1, the first embodiment of the present invention provides a method for connecting a Bluetooth key to a vehicle, including the following steps S11 to S15:

Step S11, when a mobile terminal enters a preset distance range of a vehicle, a Bluetooth master module of the vehicle performs authentication and connection with a Bluetooth key of the mobile terminal according to preset key information;

Specifically, the vehicle preset distance range refers to the distance range in which the vehicle Bluetooth system and the Bluetooth key of the mobile terminal can perform signal connection. The mobile terminal refers to a mobile smart terminal such as a mobile phone, a smart watch, a tablet computer, etc., and the smart terminal is installed with a Bluetooth key. Generally speaking, the Bluetooth key is actually an APP, that is, an application program.

Among them, after the Bluetooth key of the user's mobile terminal is successfully paired and connected to the Bluetooth master module of the vehicle for the first time, a preset key information will be generated, and the preset key information is a private key (private key), which is a one-to-one pairing, and is used for the Bluetooth connection between the Bluetooth key of a specific mobile terminal and the Bluetooth master module of the corresponding vehicle, the preset key information will be stored in the vehicle's storage unit and the mobile terminal's storage unit respectively, when the mobile terminal enters a preset distance range of the vehicle, the Bluetooth key and the Bluetooth master module of the vehicle are automatically authenticated and connected according to the preset key information.

Step S12, if the Bluetooth master module is successfully connected to the Bluetooth key, the Bluetooth master module wakes up the Bluetooth slave module of the vehicle, and generates an original random code and encrypts the original random code to obtain an encrypted random code;

Specifically, when the Bluetooth master module is successfully connected to the Bluetooth key, the Bluetooth master module will generate a wake-up signal and send the wake-up signal to the Bluetooth slave module of the vehicle, and after the Bluetooth slave module receives the wake-up signal, it is woken up, to enable subsequent authentication connection with Bluetooth key.

Meanwhile, the Bluetooth master module generates the original random code, and encrypts the original random code according to a preset encryption algorithm to obtain the encrypted random code. It can be understood that there are many kinds of encryption algorithms, and the method in this embodiment can be applied to any encryption algorithm, which is not specifically limited here.

Step S13, the Bluetooth master module sends the original random code to the Bluetooth slave module, and sends the encrypted random code to the Bluetooth key;

It could be noted that there is no restriction on the sending order of the original random code and the encrypted random code.

Step S14, the Bluetooth slave module obtains a first key signal according to the original random code, and broadcasts the first key signal; wherein the first key signal is configured to authenticate the Bluetooth slave module according to the first key signal and the encrypted random code when the Bluetooth key receives the first key signal;

For example, when the Bluetooth key receives the first key signal, it authenticates the Bluetooth slave module. Specifically, it may decrypt the encrypted random code according to a preset decryption algorithm to obtain the corresponding verification random code, and match the first key signal with the verification random code calculated locally. If they match, the Bluetooth key side authenticates the Bluetooth slave module.

It can be understood that the preset decryption algorithm matches the preset encryption algorithm.

Step S15, the Bluetooth slave module receives the second key signal of the Bluetooth key, and authenticates the Bluetooth key according to the second key signal and the original random code; wherein the second key signal is the verification random code obtained by the Bluetooth key according to the encrypted random code; When bidirectional authentication by the Bluetooth slave module and the Bluetooth key succeeds, the Bluetooth slave module is successfully connected to the Bluetooth key.

For example, when the Bluetooth slave module receives the second key signal of the Bluetooth key, it match the second key signal with the original random code. If they match, the Bluetooth slave module side authenticates the Bluetooth key.

It can be understood that in the method of this embodiment, the Bluetooth slave module and the Bluetooth key are authenticated in a bidirectional authentication manner. When bidirectional authentication by the Bluetooth slave module and the Bluetooth key succeeds, the Bluetooth slave module is successfully connected to the Bluetooth key.

Wherein the second key signal is the verification random code obtained by the Bluetooth key from the encrypted random code according to the preset decryption algorithm.

Of course, the above steps S14 and S15 are only exemplary descriptions, and the specific content of the original random code, encrypted random code, verification random code, first key signal, second key signal and their matching rules can be determined according to specific circumstances.

Applying the method of this embodiment, as long as the user's Bluetooth key has been successfully paired and connected to the vehicle's Bluetooth master module before, lately the user brings the mobile terminal close to the vehicle and enters the connectable range of the vehicle's Bluetooth master module, the vehicle's Bluetooth master module and the mobile terminal's Bluetooth key can automatically connect automatically according to the preset key information, and further authenticate and connect the Bluetooth slave module and the Bluetooth key according to the random code provided by the Bluetooth master module of the vehicle, so that the user can quickly connect the Bluetooth key to the vehicle without operating the Bluetooth key of the mobile terminal.

In some embodiments, the step S11 specifically includes: the Bluetooth master module broadcasts a first Bluetooth signal, receives a second Bluetooth signal broadcast by the Bluetooth key, and authenticates the Bluetooth key according to the second Bluetooth signal and preset key information;

Wherein, the first Bluetooth signal is configured for the Bluetooth master module to perform authentication according to the first Bluetooth signal and preset key information when the Bluetooth key receives the first Bluetooth signal; When bidirectional authentication by the Bluetooth master module and the Bluetooth key succeeds, the Bluetooth master module is successfully connected to the Bluetooth key.

Specifically, the automatic connection between the Bluetooth key and the Bluetooth master module needs to be performed in a state that both the vehicle's Bluetooth master module and the mobile terminal's Bluetooth key are turned on. It can be understood that, during the Bluetooth connection, both ends of the connection can scan the Bluetooth signal broadcast by the other party. In this embodiment, the first Bluetooth signal and the second Bluetooth signal both include the preset key information or the relevant information matched with the preset key information, so that the two can identify the Bluetooth signal of the other party according to the preset key information, and determine that the other party is the Bluetooth module that has been successfully authenticated and connected before. At this time, they will be quickly and automatically authenticated and successfully connected.

In some embodiments, the preset key information includes the UUID of the Bluetooth chip of the Bluetooth master module and the MAC address of the mobile terminal.

Specifically, the UUID refers to a universal unique identifier, which is used as a unique identification of the Bluetooth master module. The MAC (media access control address) address is also called physical address and hardware address. It is burned into the EPROM (a flash memory chip, which can usually be erased and written by a program) of a network card (Network Interface Card) when produced by a network equipment manufacturer. It can be used as the unique identification of the mobile terminal. Therefore, based on the preset key information in this embodiment, the Bluetooth master module and the Bluetooth key can quickly determine that the other party is a connectable Bluetooth module.

Figure 2:
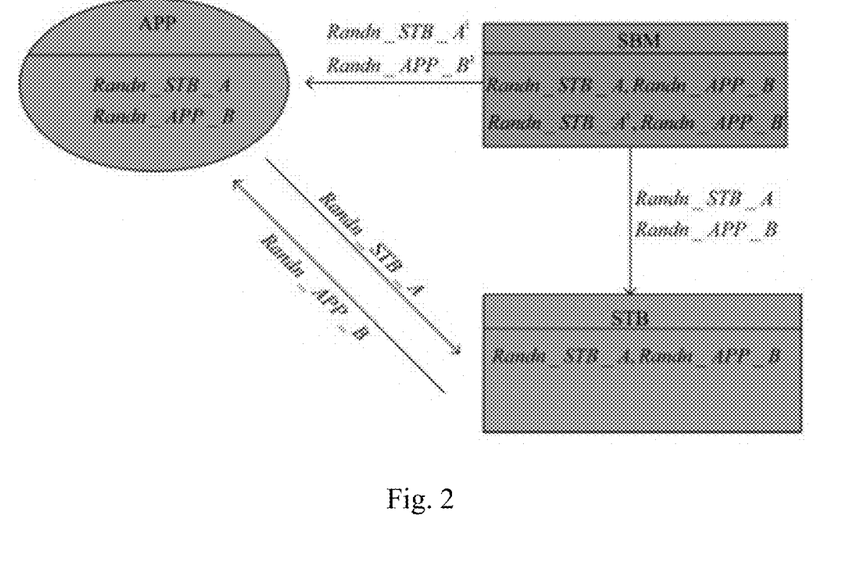
FIG. 2 is a schematic diagram of three-terminal interaction of a Bluetooth key, a Bluetooth master module, and a Bluetooth slave module in the method described in the first embodiment of the present invention.

In some embodiment, the original random code includes a first original random code Randn_STB_A and a second original random code Randn_STB_B, and the encrypted random code includes a first encrypted random code obtained according to the first original random code Randn_STB_A and a second encrypted random code Randn_STB_B1 obtained according to the second original random code Randn_STB_B;

Wherein the first key signal KEY_A is the second original random code Randn_STB_B;

Wherein the second key signal is the first verification random code Randn_KEY_A obtained by the Bluetooth key according to the first encrypted random code;

Wherein, the interaction between the Bluetooth key, the Bluetooth master module, and the Bluetooth slave module is shown in FIG. 2. In FIG. 2, APP refers to the Bluetooth key, SBM refers to the Bluetooth master module, and STB refers to the Bluetooth slave module.

Wherein Step S15 specifically includes: the Bluetooth slave module matches the first verification random code Randn_KEY_A with the first original random code Randn_STB_A; if the first verification random code Randn_KEY_A matches the first original random code Randn_STB_A, the authentication is passed;

Wherein the first key signal KEY_A is specifically configured for the Bluetooth key to authenticate the Bluetooth slave module according to the matching result of the first key signal KEY_A and the second verification random code Randn_KEY_B when the Bluetooth key receives the first key signal KEY_A, the second verification random code Randn_KEY_B is obtained by decrypting by the Bluetooth key according to the second encryption random code Randn_STB_B1 and the preset decryption algorithm, Specifically, when the signal KEY_A (Randn_STB_B) matches the second verification random code Randn_KEY_B, the Bluetooth key authenticates the Bluetooth slave module.

Specifically, the function of the first original random code Randn_STB_A in this embodiment is to effectively prevent the APP of an invalid attacking device from requesting to connect to the Bluetooth slave module, and the function of the second original random code Randn_APP_B can effectively prevent the invalid device from forging as the Bluetooth slave module and to connect with the APP, thereby improving the connection security between the Bluetooth slave module and the Bluetooth key.

Figure 3:
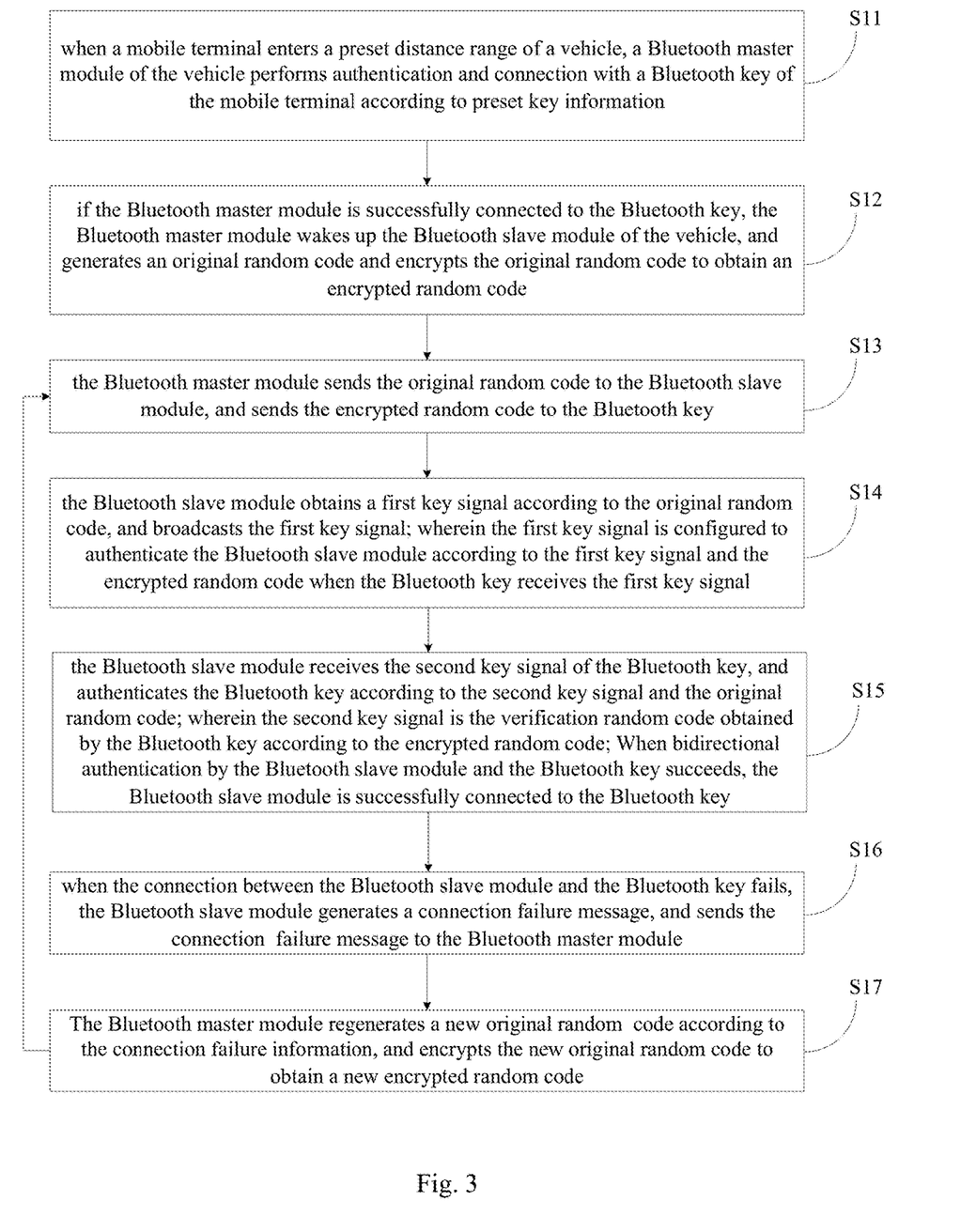
FIG. 3 is a specific schematic flowchart of a method for connecting a Bluetooth key to a vehicle according to the first embodiment of the present invention.

In some embodiments, referring to FIG. 3, the method of above-mentioned first embodiment further includes:

Step S16, when the connection between the Bluetooth slave module and the Bluetooth key fails, the Bluetooth slave module generates a connection failure message, and sends the connection failure message to the Bluetooth master module;

Specifically, when the Bluetooth slave module fails to authenticate the Bluetooth key, or the Bluetooth key fails to authenticate the Bluetooth slave module, it is determined that the current connection between the Bluetooth slave module and the Bluetooth key fails.

Step S17, The Bluetooth master module regenerates a new original random code according to the connection failure information, and encrypts the new original random code to obtain a new encrypted random code; and returns to the above step S13, According to the new original random code and the new encrypted random code, cyclically execute steps S13 to S17

Specifically, the process is as follows:
the Bluetooth master module sends the new original random code to the Bluetooth slave module, and sends the new encrypted random code to the Bluetooth key;
The Bluetooth slave module generates a new first key signal according to the new original random code, and broadcasts the new first key signal;
The Bluetooth slave module receives the new second key signal of the Bluetooth key, and authenticates the Bluetooth key according to the new second key signal and the new original random code; wherein the new second key signal is a new first verification random code obtained by parsing the new encrypted random code by the Bluetooth key;

In some embodiments, the step S17 specifically includes:
Step S171, the Bluetooth master module accumulates the number of times that the Bluetooth slave module fails to connect with the Bluetooth key according to the connection failure information, and determines whether the number of connection failure is greater than a preset threshold;
Step S172, if the number of connection failures is less than or equal to a preset threshold, the Bluetooth master module regenerates a new original random code according to the connection failure information, and encrypts the new original random code to obtain a new encrypted random code; and returns to the above step S13, According to the new original random code and the new encrypted random code, cyclically execute steps S13 to S17
Step S173, if the number of connection failures is greater than the preset threshold, the Bluetooth master module disconnects the connection with the Bluetooth key, and the Bluetooth slave module stops broadcasting the connection request, the operation of the Bluetooth key non-inductive connection to the vehicle this time fails.

In some embodiments, the vehicle includes a plurality of Bluetooth slave modules, and the plurality of Bluetooth slave modules are connected to the Bluetooth master module through CAN bus or LIN bus communication;

Wherein, the step S12 specifically includes:
The Bluetooth master module wakes up multiple Bluetooth slave modules of the vehicle;
The Bluetooth master module generates multiple groups of original random codes, and encrypts the multiple groups of original random codes to obtain multiple groups of encrypted random codes; wherein, the multiple groups of original random codes are different from each other.

Specifically, the interaction between each Bluetooth slave module, the Bluetooth master module and the Bluetooth key can refer to the description of the above-mentioned embodiment. The working principles of multiple Bluetooth slave modules are the same, only the original random code is different. In addition, the Bluetooth key performs decryption processing on the received multiple sets of different encrypted random codes according to a preset decryption algorithm to obtain multiple sets of different verification random codes, which correspond to different Bluetooth slave modules respectively and use different random codes for matching and authenticating connections. The Bluetooth connection between the Bluetooth key of the mobile terminal and the vehicle is completed only when the Bluetooth key and multiple Bluetooth slave modules of the vehicle are authenticated and connected successfully.

Figure 4:
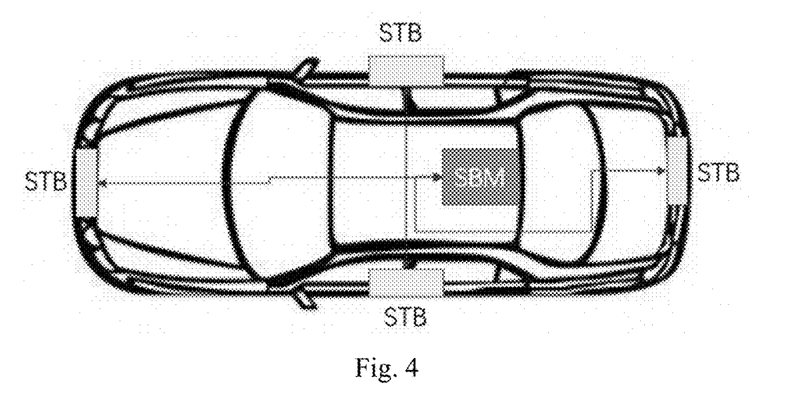
FIG. 4 is a schematic diagram of the arrangement of the Bluetooth master module and the Bluetooth slave module of the vehicle in the method according to the first embodiment of the present invention.

Exemplarily, the plurality of Bluetooth modules are specifically four Bluetooth slave modules, as shown in the figure, which are respectively arranged at the front, the rear, and the left and right sides of the vehicle.

In some embodiments, the method further includes:
The Bluetooth main module receives the signal strength information sent by the Bluetooth key, and determines the position of the Bluetooth key according to the signal strength information; wherein the signal strength information is the signal strength RSSI of the unsuccessful connected Bluetooth slave module periodically obtained by the Bluetooth key.

Specifically, after the Bluetooth master module and the Bluetooth key are successfully connected, for any Bluetooth slave module, if the Bluetooth slave module and the Bluetooth key are not successfully connected, the Bluetooth key periodically collects the signal strength RSSI of the Bluetooth slave module and sends the signal strength RSSI to the Bluetooth master module, and the Bluetooth master module performs calculation according to the signal strength RSSI to locate the Bluetooth key.

In this embodiment, in some embodiment the collection period of the signal strength is, but not limited to, 500 milliseconds.

For any Bluetooth slave module, if the Bluetooth slave module and the Bluetooth key have been successfully connected, the Bluetooth key will no longer collect the signal strength of the Bluetooth slave module, its signal strength RSSI defaults to 0, and sent to the Bluetooth master module, at this time, the connected Bluetooth slave module transmits its specific signal strength to the Bluetooth master module.

The Second Embodiment

An embodiment of the present invention further provides a vehicle Bluetooth system for performing the steps of the method for connecting a Bluetooth key to a vehicle in the embodiment. The vehicle Bluetooth system includes a Bluetooth master module SBM and one or more Bluetooth slave modules connected with the Bluetooth master module STB through the CAN bus or LIN bus communication.

Exemplarily, the plurality of Bluetooth modules are specifically four Bluetooth slave modules, as shown in the FIG. 4, which are respectively arranged at the front, the rear, and the left and right sides of the vehicle.

The system of the second embodiment described above is only illustrative, wherein the units described as separate components may or may not be physically separated, and the components displayed as units may or may not be physical units, that is, it can be located in one place, or it can be distributed over multiple network elements. Some or all of the modules may be selected according to actual needs to achieve the purpose of the solution in this embodiment.

It could be noted that the system of the second embodiment above corresponds to the method of the first embodiment. Therefore, the part of the system of the second embodiment that is not described in detail can be obtained by referring to the content of the method of the first embodiment of the above-mentioned embodiment, which is not repeated here.

Moreover, if the system of the second embodiment is implemented in the form of software functional units and sold or used as an independent product, it can be stored in a computer-readable storage medium.

Specifically, the computer-readable storage medium may include: any entity or device capable of carrying the computer program code, a recording medium, a USB flash drive, a removable hard disk, a magnetic disk, an optical disk, a computer memory, a read-only memory (ROM, Read-Only Memory), random access memory (RAM, Random Access Memory), electric carrier signal, telecommunication signal and software distribution medium, etc.

The Third Embodiment

Figure 5:
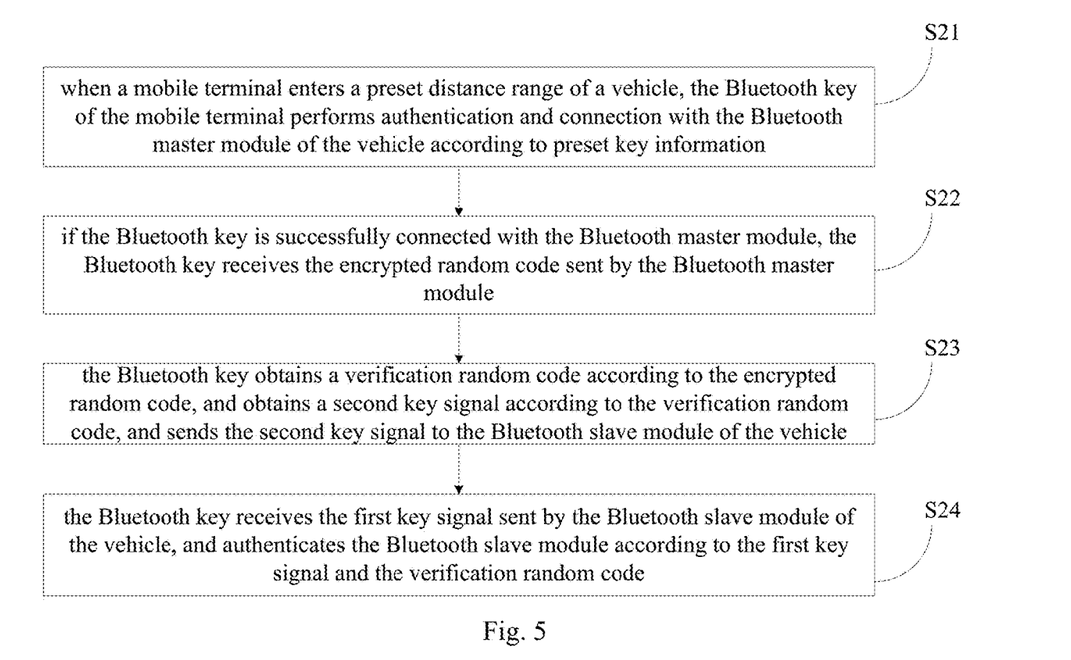
FIG. 5 is a schematic flowchart of a method for connecting a Bluetooth key to a vehicle according to the third embodiment of the present invention.

Referring to FIG. 5, the third embodiment of the present invention further provides a method for connecting a Bluetooth key to a vehicle, including the following steps S21 to S24:

Step S21, when a mobile terminal enters a preset distance range of a vehicle, the Bluetooth key of the mobile terminal performs authentication and connection with the Bluetooth master module of the vehicle according to preset key information;

Specifically, the vehicle preset distance range refers to the distance range in which the vehicle Bluetooth system and the Bluetooth key of the mobile terminal can perform signal connection. The mobile terminal refers to a mobile smart terminal such as a mobile phone, a smart watch, a tablet computer, etc., and the smart terminal is installed with a Bluetooth key. Generally speaking, the Bluetooth key is actually an APP, that is, an application program.

Among them, after the Bluetooth key of the user's mobile terminal is successfully paired and connected to the Bluetooth master module of the vehicle for the first time, a preset key information will be generated, and the preset key information is a private key (private key), which is a one-to-one pairing, and is used for the Bluetooth connection between the Bluetooth key of a specific mobile terminal and the Bluetooth master module of the corresponding vehicle, the preset key information will be stored in the vehicle's storage unit and the mobile terminal's storage unit respectively, when the mobile terminal enters a preset distance range of the vehicle, the Bluetooth key and the Bluetooth master module of the vehicle are automatically authenticated and connected according to the preset key information.

Step S22, if the Bluetooth key is successfully connected with the Bluetooth master module, the Bluetooth key receives the encrypted random code sent by the Bluetooth master module;

Specifically, when the Bluetooth master module is successfully connected to the Bluetooth key, the Bluetooth master module will generate a wake-up signal and send the wake-up signal to the Bluetooth slave module of the vehicle, and after the Bluetooth slave module receives the wake-up signal, it is woken up, to enable subsequent authentication connection with Bluetooth key. Meanwhile, the Bluetooth master module generates the original random code, and encrypts the original random code according to a preset encryption algorithm to obtain the encrypted random code. And, the Bluetooth master module sends the original random code to the Bluetooth slave module, and sends the encrypted random code to the Bluetooth key;

It can be understood that there are many kinds of encryption algorithms, and the method in this embodiment can be applied to any encryption algorithm, which is not specifically limited here.

Step S23, the Bluetooth key obtains a verification random code according to the encrypted random code, and obtains a second key signal according to the verification random code, and sends the second key signal to the Bluetooth slave module of the vehicle;

In particular, the second key signal is the verification random code obtained by the Bluetooth key from the encrypted random code according to the preset decryption algorithm.

Step S24, the Bluetooth key receives the first key signal sent by the Bluetooth slave module of the vehicle, and authenticates the Bluetooth slave module according to the first key signal and the verification random code;

For example, when the Bluetooth key receives the first key signal, it authenticates the Bluetooth slave module. Specifically, it may decrypt the encrypted random code according to a preset decryption algorithm to obtain the corresponding verification random code, and match the first key signal with the verification random code calculated locally. If they match, the Bluetooth key side authenticates the Bluetooth slave module.

Wherein, the second key signal is configured to authenticate the Bluetooth key according to the second key signal and the original random code when the Bluetooth slave module receives the second key signal, the original random code is generated by the Bluetooth master module, and the encrypted random code is obtained by the Bluetooth master module according to the original random code; When bidirectional authentication by the Bluetooth slave module and the Bluetooth key succeeds, the Bluetooth slave module is successfully connected to the Bluetooth key.

For example, when the Bluetooth slave module receives the second key signal of the Bluetooth key, it match the second key signal with the original random code. If they match, the Bluetooth slave module side authenticates the Bluetooth key.

Of course, the above steps S23 and S24 are only exemplary descriptions, and the specific content of the original random code, encrypted random code, verification random code, first key signal, second key signal and their matching rules can be determined according to specific circumstances.

Applying the method of this embodiment, as long as the user's Bluetooth key has been successfully paired and connected to the vehicle's Bluetooth master module before, lately the user brings the mobile terminal close to the vehicle and enters the connectable range of the vehicle's Bluetooth master module, the vehicle's Bluetooth master module and the mobile terminal's Bluetooth key can automatically connect automatically according to the preset key information, and further authenticate and connect the Bluetooth slave module and the Bluetooth key according to the random code provided by the Bluetooth master module of the vehicle, so that the user can quickly connect the Bluetooth key to the vehicle without operating the Bluetooth key of the mobile terminal.

In some embodiments, the Bluetooth master module of the vehicle and the Bluetooth key of the mobile terminal perform authentication and connection according to preset key information, specifically includes:

The Bluetooth key broadcasts a second Bluetooth signal, receives a first Bluetooth signal broadcast by the Bluetooth master module, and authenticates the Bluetooth master module according to the first Bluetooth signal and preset key information;

Wherein, the second Bluetooth signal is configured for the Bluetooth key to perform authentication according to the second Bluetooth signal and preset key information when the Bluetooth master module receives the second Bluetooth signal; When bidirectional authentication by the Bluetooth master module and the Bluetooth key succeeds, the Bluetooth master module is successfully connected to the Bluetooth key.

Specifically, the automatic connection between the Bluetooth key and the Bluetooth master module needs to be performed in a state that both the vehicle's Bluetooth master module and the mobile terminal's Bluetooth key are turned on. It can be understood that, during the Bluetooth connection, both ends of the connection can scan the Bluetooth signal broadcast by the other party. In this embodiment, the first Bluetooth signal and the second Bluetooth signal both include the preset key information or the relevant information matched with the preset key information, so that the two can identify the Bluetooth signal of the other party according to the preset key information, and determine that the other party is the Bluetooth module that has been successfully authenticated and connected before. At this time, they will be quickly and automatically authenticated and successfully connected.

In some embodiments, the preset key information includes the UUID of the Bluetooth chip of the Bluetooth master module and the MAC address of the mobile terminal.

Specifically, the UUID refers to a universal unique identifier, which is used as a unique identification of the Bluetooth master module. The MAC (media access control address) address is also called physical address and hardware address. It is burned into the EPROM (a flash memory chip, which can usually be erased and written by a program) of a network card (Network Interface Card) when produced by a network equipment manufacturer. It can be used as the unique identification of the mobile terminal. Therefore, based on the preset key information in this embodiment, the Bluetooth master module and the Bluetooth key can quickly determine that the other party is a connectable Bluetooth module.

In some embodiments, the Bluetooth key receives the first key signal broadcast by the Bluetooth slave module of the vehicle, specifically includes:

The Bluetooth key obtains vehicle information corresponding to the Bluetooth master module, for example the vehicle VIN code;

The Bluetooth key screens the currently received Bluetooth signal according to the vehicle information, so as to receive the first key signal broadcast by the Bluetooth slave module of the vehicle corresponding to the vehicle information.

In some embodiment, referring to FIG. 2, In FIG. 2, APP refers to the Bluetooth key, SBM refers to the Bluetooth master module, and STB refers to the Bluetooth slave module; the original random code includes a first original random code Randn_STB_A and a second original random code Randn_STB_B, and the encrypted random code includes a first encrypted random code obtained according to the first original random code Randn_STB_A and a second encrypted random code Randn_STB_B1 obtained according to the second original random code Randn_STB_B; The verification random code includes a first encrypted random code Randn_KEY_A obtained according to the first original random code and a second verification random code Randn_KEY_B obtained according to the second encrypted random code;

Wherein the first key signal KEY_A is the second original random code Randn_STB_B, and the second key signal KEY_B is the first verification random code Randn_KEY_A;

Wherein the Step S24 specifically includes: the Bluetooth key matches the second original random code Randn_STB_B with the second verification random code Randn_KEY_B; if the second original random code Randn_STB_B matches the second verification random code Randn_KEY_B, the Bluetooth key authenticates the Bluetooth slave module;

Wherein, the second key signal KEY_B is specifically configured for the Bluetooth slave module to perform authentication according to the matching result of the second key signal KEY_B (Randn_KEY_A) and the first original random code Randn_STB_A when receives the second key signal KEY_B, when the second key signal KEY_B matches the first original random code Randn_STB_A, the Bluetooth slave module authenticates the Bluetooth key.

Specifically, the function of the first original random code Randn_STB_A in this embodiment is to effectively prevent the APP of an invalid attacking device from requesting to connect to the Bluetooth slave module, and the function of the second original random code Randn_APP_B can effectively prevent the invalid device from forging as the Bluetooth slave module and to connect with the APP, thereby improving the connection security between the Bluetooth slave module and the Bluetooth key.

In some embodiments, the vehicle includes a plurality of Bluetooth slave modules, and the plurality of Bluetooth slave modules are connected to the Bluetooth master module through CAN bus or LIN bus communication;

Wherein, after the Bluetooth master module and the Bluetooth key are successfully connected, the Bluetooth master module wakes up multiple Bluetooth slave modules of the vehicle; The Bluetooth master module generates multiple groups of original random codes, and encrypts the multiple groups of original random codes to obtain multiple groups of encrypted random codes; wherein, the multiple groups of original random codes are different from each other.

Specifically, the interaction between each Bluetooth slave module, the Bluetooth master module and the Bluetooth key can refer to the description of the above-mentioned embodiment. The working principles of multiple Bluetooth slave modules are the same, only the original random code is different. In addition, the Bluetooth key performs decryption processing on the received multiple sets of different encrypted random codes according to a preset decryption algorithm to obtain multiple sets of different verification random codes, which correspond to different Bluetooth slave modules respectively and use different random codes for matching and authenticating connections. The Bluetooth connection between the Bluetooth key of the mobile terminal and the vehicle is completed only when the Bluetooth key and multiple Bluetooth slave modules of the vehicle are authenticated and connected successfully.

Exemplarily, the plurality of Bluetooth modules are specifically four Bluetooth slave modules, as shown in the FIG. 4, which are respectively arranged at the front, the rear, and the left and right sides of the vehicle.

It could be noted that the method in the third embodiment corresponds to the method in the above-mentioned first embodiment. This embodiment is the connection operation process on the side of the Bluetooth key of the mobile terminal, and the method in the first embodiment is the connection operation process on the vehicle side. Therefore, the content not described in detail in the method in the third embodiment can be obtained by referring to the content in the method in the first embodiment, and details are not repeated here.

The Fourth Embodiment

Figure 6:
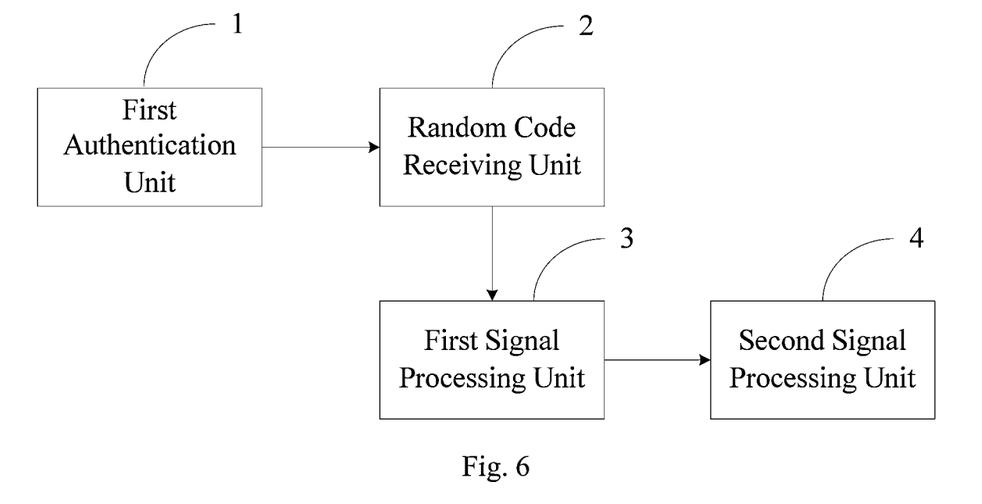
FIG. 6 is a system frame diagram of a Bluetooth key according to the fourth embodiment of the present invention.

Referring to FIG. 6, an fourth embodiment of the present invention provides a Bluetooth key for performing the steps of the method for connecting a Bluetooth key to a vehicle according to the embodiment of the third embodiment, the Bluetooth key including:
  a first authentication unit 1, configured to for the Bluetooth master module of the vehicle and the Bluetooth key to perform authentication and connection according to preset key information when a mobile terminal equipped with the Bluetooth key enters a preset distance range of a vehicle;
  a random code receiving unit 2, configured for the Bluetooth key to receive the encrypted random code sent by the Bluetooth master module if the Bluetooth key is successfully connected with the Bluetooth master module;
  a first signal processing unit 3, configured for the Bluetooth key to obtain a verification random code according to the encrypted random code, and obtain a second key signal according to the verification random code, and send the second key signal to the Bluetooth slave module of the vehicle; and
  a second signal processing unit 4, configured for the Bluetooth key to receive the first key signal sent by the Bluetooth slave module of the vehicle, and authenticate the Bluetooth slave module according to the first key signal and the verification random code;
  Wherein, the second key signal is configured to authenticate the Bluetooth key according to the second key signal and the original random code when the Bluetooth slave module receives the second key signal, the original random code is generated by the Bluetooth master module, and the encrypted random code is obtained by the Bluetooth master module according to the original random code; When bidirectional authentication by the Bluetooth slave module and the Bluetooth key succeeds, the Bluetooth slave module is successfully connected to the Bluetooth key.

The embodiment of the Bluetooth key described above is only illustrative, wherein the units described as separate components may or may not be physically separated, and the components displayed as units may or may not be physical units, that is, it can be located in one place, or it can be distributed over multiple network elements. Some or all of the modules may be selected according to actual needs to achieve the purpose of the solution in this embodiment.

It could be noted that the Bluetooth key of the above embodiment corresponds to the method of the third embodiment. Therefore, the part of the Bluetooth key of the embodiment that is not described in detail can be obtained by referring to the content of the method of the third embodiment of the above-mentioned embodiment, which is not repeated here.

Moreover, if the Bluetooth key of the above embodiment is implemented in the form of software functional units and sold or used as an independent product, it can be stored in a computer-readable storage medium.

Specifically, the computer-readable storage medium may include: any entity or device capable of carrying the computer program code, a recording medium, a USB flash drive, a removable hard disk, a magnetic disk, an optical disk, a computer memory, a read-only memory (ROM, Read-Only Memory), random access memory (RAM, Random Access Memory), electric carrier signal, telecommunication signal and software distribution medium, etc.

Various embodiments of the present invention have been described above, and the foregoing descriptions are exemplary, not exhaustive, and not limiting of the disclosed embodiments. Numerous modifications and variations will be apparent to those of ordinary skill in the art without departing from the scope and spirit of the described embodiments The terminology used in the present disclosure was chosen to best explain the principles of the various embodiments, practical application or technical improvement in the marketplace, or to enable others of ordinary skill in the art to understand the various embodiments disclosed herein.

What is claimed is:

1. A method for connecting a Bluetooth key to a vehicle, comprises:
  Performing, by a Bluetooth master module of a vehicle, authentication and connection with a Bluetooth key of a mobile terminal according to preset key information when the mobile terminal enters a preset distance range of the vehicle;
  Waking up, by the Bluetooth master module, the Bluetooth slave module of the vehicle, and generating an original random code and encrypting the original random code to obtain an encrypted random code if the Bluetooth master module is successfully connected to the Bluetooth key;
  Sending, by the Bluetooth master module, the original random code to the Bluetooth slave module and sending the encrypted random code to the Bluetooth key;
  Obtaining, by the Bluetooth slave module, a first key signal according to the original random code, and broadcasting the first key signal; wherein the first key signal is configured to authenticate the Bluetooth slave module according to the first key signal and the encrypted random code when the Bluetooth key receives the first key signal;
  Receiving, by the Bluetooth slave module, the second key signal of the Bluetooth key, and authenticating the Bluetooth key according to the second key signal and the original random code; wherein the second key signal is the verification random code obtained by the Bluetooth key according to the encrypted random code; When bidirectional authentication by the Bluetooth slave module and the Bluetooth key succeeds, the Bluetooth slave module is successfully connected to the Bluetooth key.

2. The method for connecting a Bluetooth key to a vehicle as claimed in claim 1, wherein, performing, by a Bluetooth master module of a vehicle, authentication and connection with a Bluetooth key of a mobile terminal according to preset key information, specifically comprises:

Broadcasting, by the Bluetooth master module, a first Bluetooth signal, receiving a second Bluetooth signal broadcast by the Bluetooth key, and authenticating the Bluetooth key according to the second Bluetooth signal and preset key information;

Wherein, the first Bluetooth signal is configured for the Bluetooth master module to perform authentication according to the first Bluetooth signal and preset key information when the Bluetooth key receives the first Bluetooth signal; When bidirectional authentication by the Bluetooth master module and the Bluetooth key succeeds, the Bluetooth master module is successfully connected to the Bluetooth key.

3. The method for connecting a Bluetooth key to a vehicle as claimed in claim 2, wherein, the preset key information includes the UUID of the Bluetooth chip of the Bluetooth master module and the MAC address of the mobile terminal.

4. The method for connecting a Bluetooth key to a vehicle as claimed in claim 1, wherein, the original random code includes a first original random code and a second original random code, and the encrypted random code includes a first encrypted random code obtained according to the first original random code and a second encrypted random code obtained according to the second original random code;

Wherein the first key signal is the second original random code;

Wherein the second key signal is the first verification random code obtained by the Bluetooth key according to the first encrypted random code;

Wherein the Bluetooth slave module authenticates the Bluetooth key according to the second key signal and the original random code, specifically includes: the Bluetooth slave module matches the first verification random code with the first original random code; if the first verification random code matches the first original random code, the authentication is passed;

Wherein the first key signal is specifically configured for the Bluetooth key to authenticate the Bluetooth slave module according to the matching result of the first key signal and the second verification random code when the Bluetooth key receives the first key signal, the second verification random code is obtained by the Bluetooth key according to the second encryption random code.

5. The method for connecting a Bluetooth key to a vehicle as claimed in claim 1, wherein, the method further comprises:

Generating, by the Bluetooth slave module, a connection failure message, and sending the connection failure message to the Bluetooth master module When the connection between the Bluetooth slave module and the Bluetooth key fails;

Regenerating, by the Bluetooth master module, a new original random code according to the connection failure information, and encrypting the new original random code to obtain a new encrypted random code;

Sending, by the Bluetooth master module, the new original random code to the Bluetooth slave module, and sending the new encrypted random code to the Bluetooth key;

Generating, by the Bluetooth slave module, a new first key signal according to the new original random code, and broadcasts the new first key signal;

Receiving, by the Bluetooth slave module, the new second key signal of the Bluetooth key, and authenticating the Bluetooth key according to the new second key signal and the new original random code; wherein the new second key signal is a new first verification random code obtained by parsing the new encrypted random code by the Bluetooth key.

6. The method for connecting a Bluetooth key to a vehicle as claimed in claim 5, wherein, regenerating, by the Bluetooth master module, a new original random code according to the connection failure information, and encrypting the new original random code to obtain a new encrypted random code, specifically comprises:

Accumulating, by the Bluetooth master module, the number of times that the Bluetooth slave module fails to connect with the Bluetooth key according to the connection failure information, and determining whether the number of connection failure is greater than a preset threshold;

Regenerating, by the Bluetooth master module, a new original random code according to the connection failure information If the number of connection failures is less than or equal to the preset threshold;

Disconnecting, by the Bluetooth master module, the connection with the Bluetooth key, and stopping, by the Bluetooth slave module, broadcasting the connection request if the number of connection failures is greater than the preset threshold.

7. The method for connecting a Bluetooth key to a vehicle as claimed in claim 1, wherein, the vehicle includes a plurality of Bluetooth slave modules, and the plurality of Bluetooth slave modules are connected to the Bluetooth master module through CAN bus or LIN bus communication;

wherein, waking up, by the Bluetooth master module, the Bluetooth slave module of the vehicle, and generating an original random code and encrypting the original random code to obtain an encrypted random code if the Bluetooth master module is successfully connected to the Bluetooth key, specifically comprises:

Waking up, by the Bluetooth master module, multiple Bluetooth slave modules of the vehicle;

Generating, by the Bluetooth master module, multiple groups of original random codes, and encrypting the multiple groups of original random codes to obtain multiple groups of encrypted random codes; wherein, the multiple groups of original random codes are different from each other.

8. The method for connecting a Bluetooth key to a vehicle as claimed in claim 7, wherein, the method further comprises:

Receiving, by the Bluetooth main module, the signal strength information sent by the Bluetooth key, and determining the position of the Bluetooth key according to the signal strength information; wherein the signal strength information is the signal strength of the unsuccessful connected Bluetooth slave module periodically obtained by the Bluetooth key.

9. A vehicle Bluetooth system for performing the method for connecting a Bluetooth key to a vehicle, wherein, the vehicle Bluetooth system includes a Bluetooth master module and one or more Bluetooth slave modules connected with the Bluetooth master module through the CAN bus or LIN bus communication;

The method comprises:

Performing, by the Bluetooth master module of the vehicle, authentication and connection with the Bluetooth key of a mobile terminal according to preset key information when the mobile terminal enters a preset distance range of the vehicle;

Waking up, by the Bluetooth master module, the Bluetooth slave module of the vehicle, and generating an original random code and encrypting the original random code to obtain an encrypted random code if the Bluetooth master module is successfully connected to the Bluetooth key;

Sending, by the Bluetooth master module, the original random code to the Bluetooth slave module and sending the encrypted random code to the Bluetooth key;

Obtaining, by the Bluetooth slave module, a first key signal according to the original random code, and broadcasting the first key signal; wherein the first key signal is configured to authenticate the Bluetooth slave module according to the first key signal and the encrypted random code when the Bluetooth key receives the first key signal;

Receiving, by the Bluetooth slave module, the second key signal of the Bluetooth key, and authenticating the Bluetooth key according to the second key signal and the original random code; wherein the second key signal is the verification random code obtained by the Bluetooth key according to the encrypted random code; When bidirectional authentication by the Bluetooth slave module and the Bluetooth key succeeds, the Bluetooth slave module is successfully connected to the Bluetooth key.

10. A method for connecting a Bluetooth key to a vehicle, comprises:

Performing, by the Bluetooth key of a mobile terminal, authentication and connection according to preset key information with a Bluetooth master module of the vehicle when a mobile terminal enters a preset distance range of a vehicle;

Receiving, by the Bluetooth key, the encrypted random code sent by the Bluetooth master module if the Bluetooth key is successfully connected with the Bluetooth master module;

Obtaining, by the Bluetooth key, a verification random code according to the encrypted random code, and obtains a second key signal according to the verification random code, and sends the second key signal to the Bluetooth slave module of the vehicle;

Receiving, by the Bluetooth key, the first key signal sent by the Bluetooth slave module of the vehicle, and authenticating the Bluetooth slave module according to the first key signal and the verification random code;

Wherein, the second key signal is configured to authenticate the Bluetooth key according to the second key signal and the original random code when the Bluetooth slave module receives the second key signal, the original random code is generated by the Bluetooth master module, and the encrypted random code is obtained by the Bluetooth master module according to the original random code; When bidirectional authentication by the Bluetooth slave module and the Bluetooth key succeeds, the Bluetooth slave module is successfully connected to the Bluetooth key.

11. The method for connecting a Bluetooth key to a vehicle as claimed in claim 10, wherein, performing, by the Bluetooth key of a mobile terminal, authentication and connection according to preset key information with a Bluetooth master module of the vehicle when a mobile terminal enters a preset distance range of a vehicle, specifically comprises:

Broadcasting, by the Bluetooth key, a second Bluetooth signal, receiving a first Bluetooth signal broadcast by the Bluetooth master module, and authenticating the Bluetooth master module according to the first Bluetooth signal and preset key information;

Wherein, the second Bluetooth signal is configured for the Bluetooth key to perform authentication according to the second Bluetooth signal and preset key information when the Bluetooth master module receives the second Bluetooth signal; When bidirectional authentication by the Bluetooth master module and the Bluetooth key succeeds, the Bluetooth master module is successfully connected to the Bluetooth key.

12. The method for connecting a Bluetooth key to a vehicle as claimed in claim 11, wherein, the preset key information includes the UUID of the Bluetooth chip of the Bluetooth master module and the MAC address of the mobile terminal.

13. The method for connecting a Bluetooth key to a vehicle as claimed in claim 11, wherein, receiving, by the Bluetooth key, the first key signal sent by the Bluetooth slave module of the vehicle, specifically comprises:

Obtaining, by the Bluetooth key, vehicle information corresponding to the Bluetooth master module;

Screening, by the Bluetooth key, the currently received Bluetooth signal according to the vehicle information, so as to receive the first key signal broadcast by the Bluetooth slave module of the vehicle corresponding to the vehicle information.

14. The method for connecting a Bluetooth key to a vehicle as claimed in claim 10, wherein, the original random code includes a first original random code and a second original random code, and the encrypted random code includes a first encrypted random code obtained according to the first original random code and a second encrypted random code obtained according to the second original random code; The verification random code includes a first encrypted random code obtained according to the first original random code and a second verification random code obtained according to the second encrypted random code;

Wherein the first key signal is the second original random code, and the second key signal is the first verification random code;

Wherein the Bluetooth key authenticates the Bluetooth slave module according to the first key signal and the verification random code, specifically includes: the Bluetooth key matches the second original random code with the second verification random code; if the second original random code matches the second verification random code, the authentication is passed;

Wherein, the second key signal is specifically configured for the Bluetooth slave module to perform authentication according to the matching result of the second key signal and the first original random code when receives the second key signal.

* * * * *